US008665751B2

(12) United States Patent
Mishra et al.

(10) Patent No.: US 8,665,751 B2
(45) Date of Patent: *Mar. 4, 2014

(54) DIGITAL SUBSCRIBER LINE (DSL) NETWORK UPGRADE TOOL

(75) Inventors: Anurag K. Mishra, Tampa, FL (US); Ashis Sarkar, Tampa, FL (US); Senthilkumaran Kulandaivelan, Tampa, FL (US); Joseph R. Manning, Indian Head, MD (US); Dhaval V. Thaker, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/081,551

(22) Filed: Apr. 7, 2011

(65) Prior Publication Data

US 2011/0182341 A1  Jul. 28, 2011

Related U.S. Application Data

(63) Continuation of application No. 12/204,368, filed on Sep. 4, 2008, now Pat. No. 7,944,855.

(51) Int. Cl.
*H04L 12/28* (2006.01)

(52) U.S. Cl.
USPC ........... 370/254; 709/221; 715/735; 715/969; 717/171

(58) Field of Classification Search
None
See application file for complete search history.

(56) References Cited

U.S. PATENT DOCUMENTS

| 6,580,727 | B1* | 6/2003 | Yim et al. ..................... 370/463 |
| 6,819,746 | B1 | 11/2004 | Schneider et al. |
| 6,829,250 | B2 | 12/2004 | Voit et al. |
| 7,079,840 | B2* | 7/2006 | Roberts et al. ................ 455/434 |
| 7,170,905 | B1 | 1/2007 | Baum et al. |
| 7,274,655 | B1* | 9/2007 | Young et al. .................. 370/218 |
| 7,408,874 | B2* | 8/2008 | Meggison et al. ............ 370/216 |
| 7,944,855 | B2* | 5/2011 | Mishra et al. ................. 370/254 |
| 2003/0078999 | A1* | 4/2003 | Lund et al. .................... 709/220 |
| 2004/0032879 | A1* | 2/2004 | Keller-Tuberg et al. ...... 370/465 |
| 2004/0136394 | A1* | 7/2004 | Onno et al. ................... 370/438 |
| 2006/0274668 | A1* | 12/2006 | Franklin et al. ............... 370/252 |
| 2007/0153799 | A1 | 7/2007 | Sorrini et al. |

* cited by examiner

*Primary Examiner* — Brian Roberts

(57) ABSTRACT

A network upgrade tool identifies at least one new digital subscriber line (DSL) path pre-provisionable elements associated with the at least one new DSL path. The tool provisions the identified pre-provisionable elements prior to transition from at least one existing DSL path to the at least one new DSL path; receives a notification that physical network changes associated with a target digital subscriber line access multiplexer (DSLAM) have been made; and provisions non-pre-provisioned elements following receipt of the notification.

19 Claims, 6 Drawing Sheets

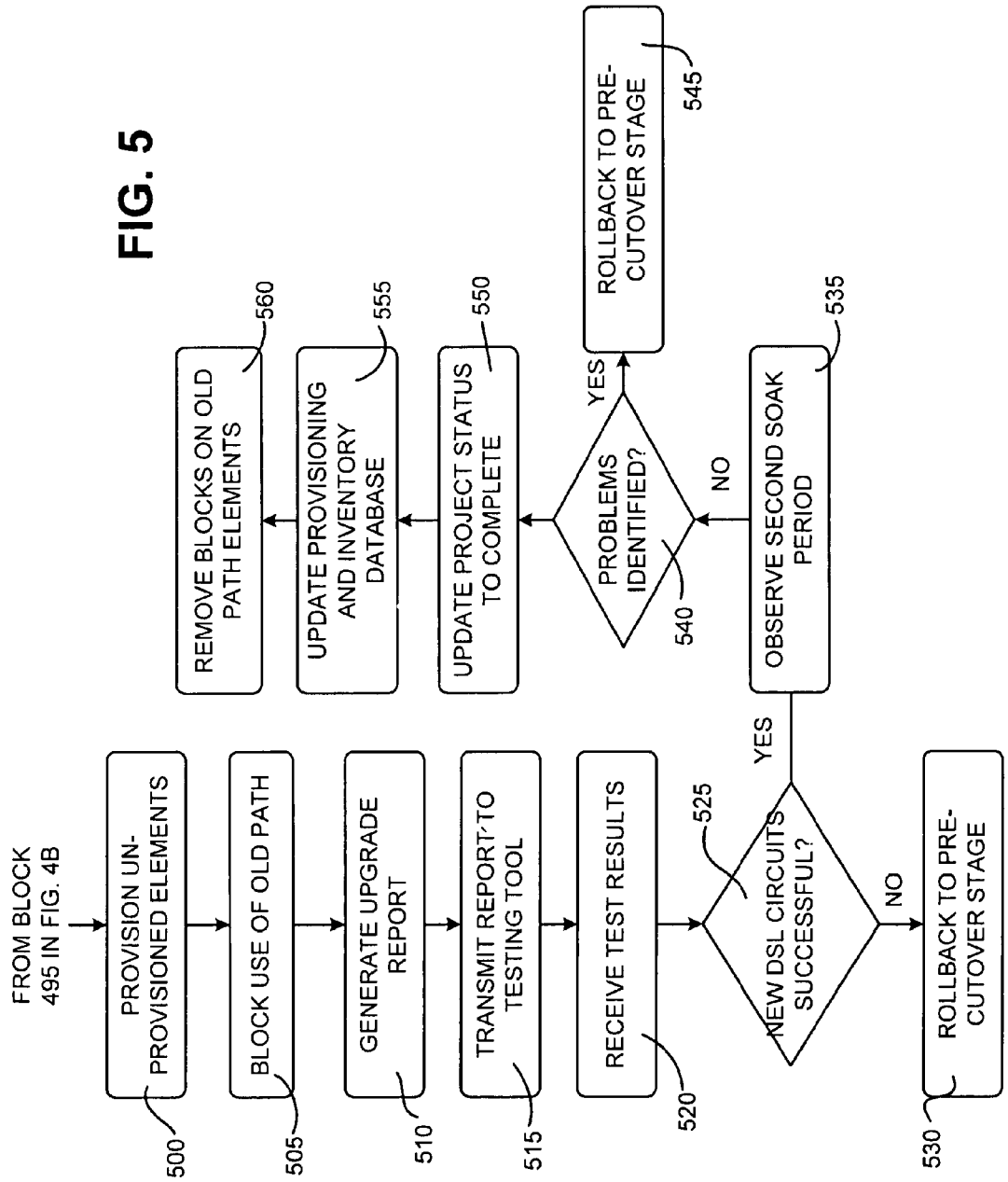

DIGITAL SUBSCRIBER LINE (DSL) NETWORK UPGRADE TOOL

CROSS REFERENCE TO RELATED APPLICATION

This application is a continuation of U.S. patent application Ser. No. 12/204,368, filed on Sep. 4, 2008, the entirety of which is hereby incorporated by reference herein.

BACKGROUND

DSL (digital subscriber line) is a technology for bringing high-bandwidth information to homes and small businesses over ordinary copper telephone lines. A DSL line can simultaneously carry both data and voice signals. The data portion of the line may be continuously available to the user, making DSL an "always-on" connection. Special digital hardware attached to both ends of the line allows data transmission over the wires at far greater speed than standard analog 56 kilobyte (K) modems.

DSL is offered to users by DSL providers. DSL providers connect user DSL modems, through a digital subscriber line, to a central office. Typically, the distance between the user and the central office must be less than a certain distance, such as about four miles, for the DSL connection to operate properly. At the central office, signals from the DSL user may be packetized and transmitted to a larger network, such as an asynchronous transfer mode (ATM) network that connects to an Internet Service Provider (ISP).

DSL providers may operate a number of DSL circuits which are subject to congestion based on the bandwidth needs of the customers connected to the DSL circuits. For example, legacy DSL circuits may share a single DS3 link (operating at 45 Megabits per second (Mbps)) between "1,296" customers. Unfortunately, the bandwidth available to individual customers in such legacy DSL circuits is quickly becoming insufficient.

BRIEF DESCRIPTION OF THE DRAWINGS

FIGS. 4A-5 illustrate flow charts of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may facilitate the efficient and accurate upgrade of a DSL network by providing a network upgrade tool that connects to the various DSL network elements. The network upgrade tool may receive upgrade project information, and may identify appropriate network paths and initiate pre-provisioning or cutover provisioning of the new paths. In addition, the network upgrade tool may facilitate periodic validation and verification throughout the upgrade process, and may provide the ability to rollback the upgrade project at any point prior to (and even immediately following) cutover to the upgrade paths. In one implementation, the network upgrade tool may also provide for synchronization of the upgrade project with changes made to affected DSL customer accounts.

Figure 1:
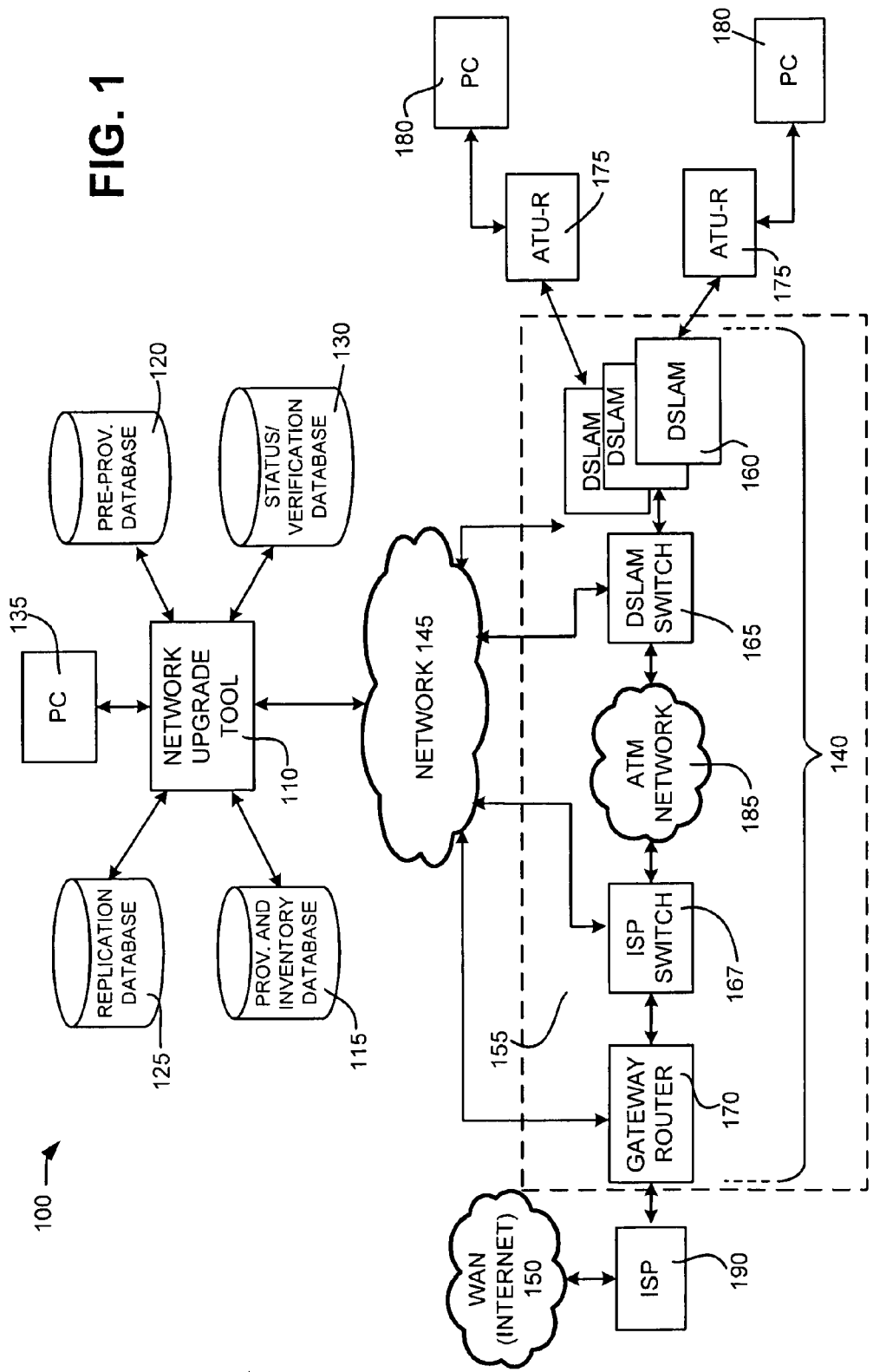
FIG. 1 depicts a diagram of an exemplary network in which systems and/or methods described herein may be implemented.

FIG. 1 is a diagram of an exemplary system 100 in which systems and/or methods described herein may be implemented. As illustrated, system 100 may include a network upgrade tool 110, inventory database 115, pre-provisioning database 120, replication database 125, status/verification database 130, user interface device 135, DSL circuit elements 140, network 145, wide area network 150, central office (CO) 155, digital subscriber line access multiplexers (DSLAMS) 160, L2 switch 165, gateway router 170, ATM termination units—remote side (ATU-Rs) 175, customer premises equipment (e.g., PCs) 180, ATM network 185, and Internet service providers (ISPs) 190.

Network upgrade tool 110 may include a software program designed to analyze, upgrade, and/or provision elements and user accounts in DSL circuits. Network upgrade tool 110 may be connected to a number of databases. As shown, network upgrade tool 110 may interface with provisioning and inventory database 115, pre-provisioning database 120, replication database 125, and/or status/verification database 130. Provisioning and inventory database 115 may store information relating to customer account information, particularly including the DSL circuit elements (e.g. DSLAM, switch, router, etc.) used to service each customer. Pre-provisioning database 120 may include information for pre-provisioning customers on new or upgraded DSL circuit elements. This database may include a list of specifications or requirements that are to be completed before DSL service is successfully provisioned to particular customers.

Replication database 125 may include a database that network upgrade tool 110 uses to temporarily store information received from provisioning and inventory database 115. In contrast to databases 115 and 120, which may be shared throughout the enterprise and coupled to network upgrade tool 110 through a network such as a local area network (LAN), replication database 125 may be local to, and dedicated exclusively to, network upgrade tool 110. Accordingly, relative to databases 115 and 120, replication database 125 may be considered to be a "fast" access database. Status/verification database 130 may include verification or status results for various stages within a pre-provisioning or upgrade process.

Network upgrade tool 110 may be remotely accessed and controlled to facilitate upgrade of DSL customers via a user interface device (e.g., PC) 135. In one implementation, network upgrade tool 110 may present a web-based interface to the user of device 135. Accordingly, remote users may interact with network upgrade tool 110 through user interface device 135 (e.g., via any computer that contains a web browsing program and a network connection to network upgrade tool 110).

As further shown in FIG. 1, network upgrade tool 110 may connect to a number of DSL circuit elements 140 through a network 145. Network 145 may be a private network operated by the DSL service provider. In the illustrated embodiment, system 100 may support ADSL (asymmetric DSL), which the carrier may offer in grades supporting 640 kbps, 1.6 Mbps, or 7.1 Mbps (downstream) rates for Internet access. The actual communications over the DSL loops, however, may run adaptively at the maximum rates that the line conditions allow.

In the illustrated example, system 100 may provide access to a first domain in the form of a wide area internetwork, such as the public Internet, corporate local area networks (LANs), and the like, represented by network cloud 150 for the ISPs. The high speeds available through system 100 may enable a wide range of communications, such as, for example, of text data, of video data, for multimedia, for web browsing, of transfers of files, for database searching, and the like via the network(s) 150.

As further shown in FIG. 1, system 100 may include a central office (CO) 155 that includes a number of Digital Subscriber Line Access Multiplexers (DSLAMs) 160, a DSLAM L2 switch 165 (L2 refers to layer 2 of the OSI (Open Systems Interconnection) reference model relating to ATM networks), an ATM network 185, an ISP L2 switch 167, and a gateway router 170. As will be described in additional detail below, network upgrade tool 110 may interoperably connect to DSLAMs 160, L2 switches 165 and 167, and/or gateway router 170 to perform upgrade operations relating to system 100.

In one exemplary implementation, it may be assumed that the equipment at the various customer premises connect directly to the CO 155 via twisted pair type copper wiring. In an actual implementation, many customers may connect through such wiring to a remote terminal linked to the CO 155 via optical fiber or even via wireless links. Other hardwired, optical or wireless implementations of the digital subscriber lines are described below. In the illustrated embodiment, each line from a customer premises may connect to an ATU-C (central office-side ADSL terminal unit) within one of the DSLAMs 160.

On the customer premises side, DSLAMs 160 may connect to an ADSL terminal unit (remote) or ATU-R 175. Each ATU-R 175 may include a modulator/demodulator (modem) for communicating with DSLAM 160, in accord with the ADSL protocols. ATU-R 175, in turn, may connect to customer premises equipment, shown by way of example as personal computers (PCs) 180 at each illustrated customer location. In other implementations, customer premises equipment 180 may include a wide range of other types of devices having data communications capabilities. For example, customer premises equipment 180 may include a laptop, a personal computer, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or other types of computation or communication devices, threads or processes running on these devices, and/or objects executable by these devices.

Each DSLAM 160 may include a bank of ATU-Cs and a multiplexer/demultiplexer (MUX) for selecting therebetween. In operation, customer lines from ATU-Rs 175 may connect to an assigned ATU-C associated with a particular DSLAM 160. The ADSL units in DSLAMs 160 essentially act as modulator/demodulators (modems) for sending and receiving data over the subscriber telephone lines. On the network side, each of the ATU-Cs may connect to a multiplexer (MUX) in DSLAM 160. The MUX in each DSLAM 160 may multiplex and/or demultiplex upstream and downstream data for the ATU-Cs, and may provide a connection to a high-speed link to DSLAM switch 165.

In some implementations, DSLAMS 160 may include an advanced services access manager (ASAM). An ASAM may include a network device capable of managing multiple DSLAMS 160. In one implementation, network upgrade tool 110 may communicate DSLAM changes to ASAM, which, in turn, forwards appropriate commands/instructions to DSLAMS 160.

In an exemplary implementation, the concentrated data communications may utilize a DS3 link to provide two-way data communication between central office 155 and L2 switches 165 and/or 167. However, as will be described in additional detail below, because of increasing traffic demands, it may be increasingly necessary to upgrade the link to L2 switches 165 and/or 167 to a SONET-based optical fiber, such as OC3 (155 Mbps) or in some cases even OC12 (622 Mbps). Although only one link appears in FIG. 1, DSLAM switch 165 may service a number of DSLAMs 160 in various end offices via similar DS or OC links. DSLAM switch 165, in turn, may provide a high-speed connection to gateway router 170 via ATM network 185 and ISP switch 167. DSLAM switch 165, ATM network 185, and ISP switch may operate to aggregate traffic from a number of links onto an OC3 or higher rate SONET link to the gateway router 170. ATM network 185 and gateway router 170 may enable transport of ATM cells for the subscribers to and from equipment of one or more Internet Service Providers (ISPs) 190.

It should be noted that switches 165 and 167 are designated as an "L2" switch here as a matter of convenience, to illustrate that the switch 165 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by switches 165 and 167 are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer. It should be further noted that CO 155 also may support operations relating to providing plain old telephone service (POTS). However, elements relating thereto have been have been omitted for the purposes of simplicity.

For digital data communication purposes, the ATU-C and ATU-R modem units may create at least two logical channels in the frequency spectrum above that used for the normal telephone traffic. One of these channels may be a medium speed duplex channel; the other may be a high-speed downstream only channel. Such modems may implement either one of two techniques for dividing the usable bandwidth of the telephone line to provide these channels. One approach may be to divide the usable bandwidth of a twisted wire pair telephone line by frequency, that is to say by Frequency Division Multiplexing (FDM). The other approach may use Echo Cancellation. FDM may use one frequency band for upstream data and another frequency band for downstream data. The downstream path may be divided by time division multiplexing signals into one or more high-speed channels and one or more low speed channels. The upstream path also may be time-division multiplexed into corresponding low speed channels. With echo cancellation, the upstream band and downstream band may substantially over-lap. The modems may separate the upstream and downstream signals by means of local echo cancellors, in a manner similar to that used in V.32 and V.34 modems.

In some implementations, DSL modems incorporated within ATU-Cs and ATU-Rs may use a number of different modulation techniques to physically transport digital data streams. A number of implementations of the modems have used carrierless amplitude phase (CAP) modulation. Most current xDSL modems, however, utilize a discrete multi-tone (DMT) approach.

To efficiently provide cell relay, DSLAMs 160 may be provisioned to assign a virtual circuit for each customer that extends from the ATU-R 175 in the respective customer premises to gateway router 170. This logical circuit may be defined at the layer-2 protocol level. In accordance with one exemplary implementation, this logical communication circuit may be an ATM permanent virtual circuit (PVC), although other types of logical circuits or channels may be used.

Gateway router 170 may terminate the provisioned permanent virtual circuits (PVCs) through to ISPs 190. For example, for communication with a selected ISP 190, gateway router 165 may route cells from the PVC assigned to the subscriber through to the PVC of the selected ISP 190. In the opposite direction, gateway router 170 may route cells from the PVC associated with the selected ISP 190 through to the PVC of the particular subscriber.

Typical DSLAMS 160 may support "1,296" PVCs per DS3 link. As will be described in additional detail below, network upgrade tool 110 may facilitate various upgrade mechanisms for improving bandwidth available on each PVC and hence, for each customer receiving service. In one implementation, network upgrade tool 110 may provide for the logical splitting of a DSLAM 160 to form multiple logical or virtual DSLAMS 160, each with its own DS3 or OC3 link. For example, DSLAM 160, which may connect to a single link to switch 165, may be split into three logical DSLAMS, each with its own DS3 link to DSLAM switch 165. The splitting of DSLAM 160 may result in an improved ratio of 432 PVCs per DS3 link, rather than 1296. This modification may increase available bandwidth for each customer by as much as 300%. Alternatively, DSLAM 160 may be upgraded from a DS3 link to an OC3 link. Similar to the splitting scenario, the upgrade scenario may result in improved bandwidth of 300% per PVC. Selection between splitting and upgrade options may be made based on available link resources.

Figure 2:
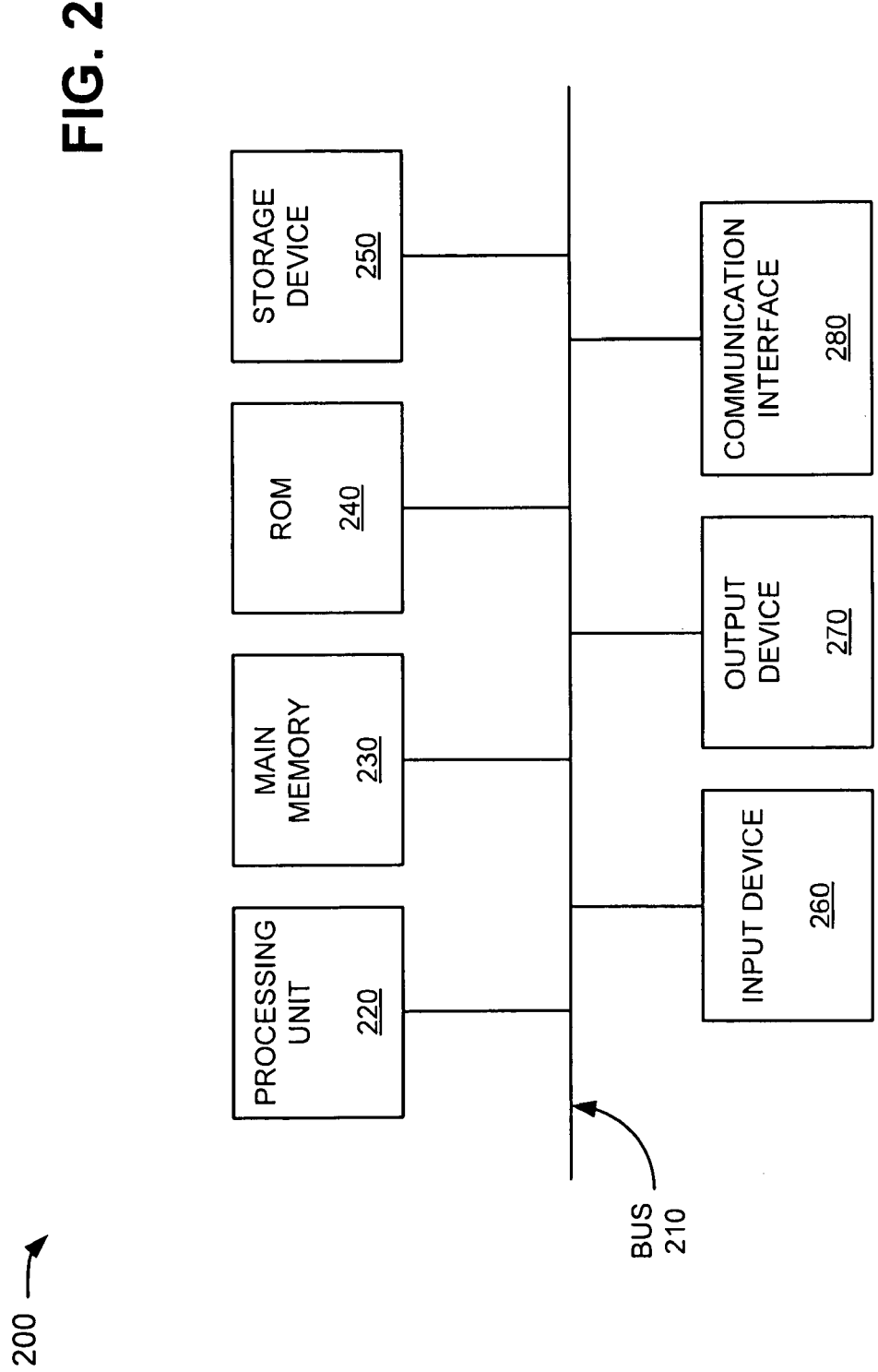
FIG. 2 illustrates exemplary components of a device of the network depicted in FIG. 1.

FIG. 2 is a block diagram of an exemplary device 200, which may correspond to one or more of network upgrade tool 110, databases 115-130, user interface device 135, DSLAMs 160, L2 switches 165/167, and/or gateway router 170. As illustrated, device 200 may include a bus 210, a processing unit 220, a main memory 230, a read only memory (ROM) 240, a storage device 250, an input device 260, an output device 270, and a communication interface 280. Bus 210 may include a path that permits communication among the elements of the device.

Processing unit 220 may include a processor, microprocessor, or other type of processing device that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 145.

As described herein, device 200 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
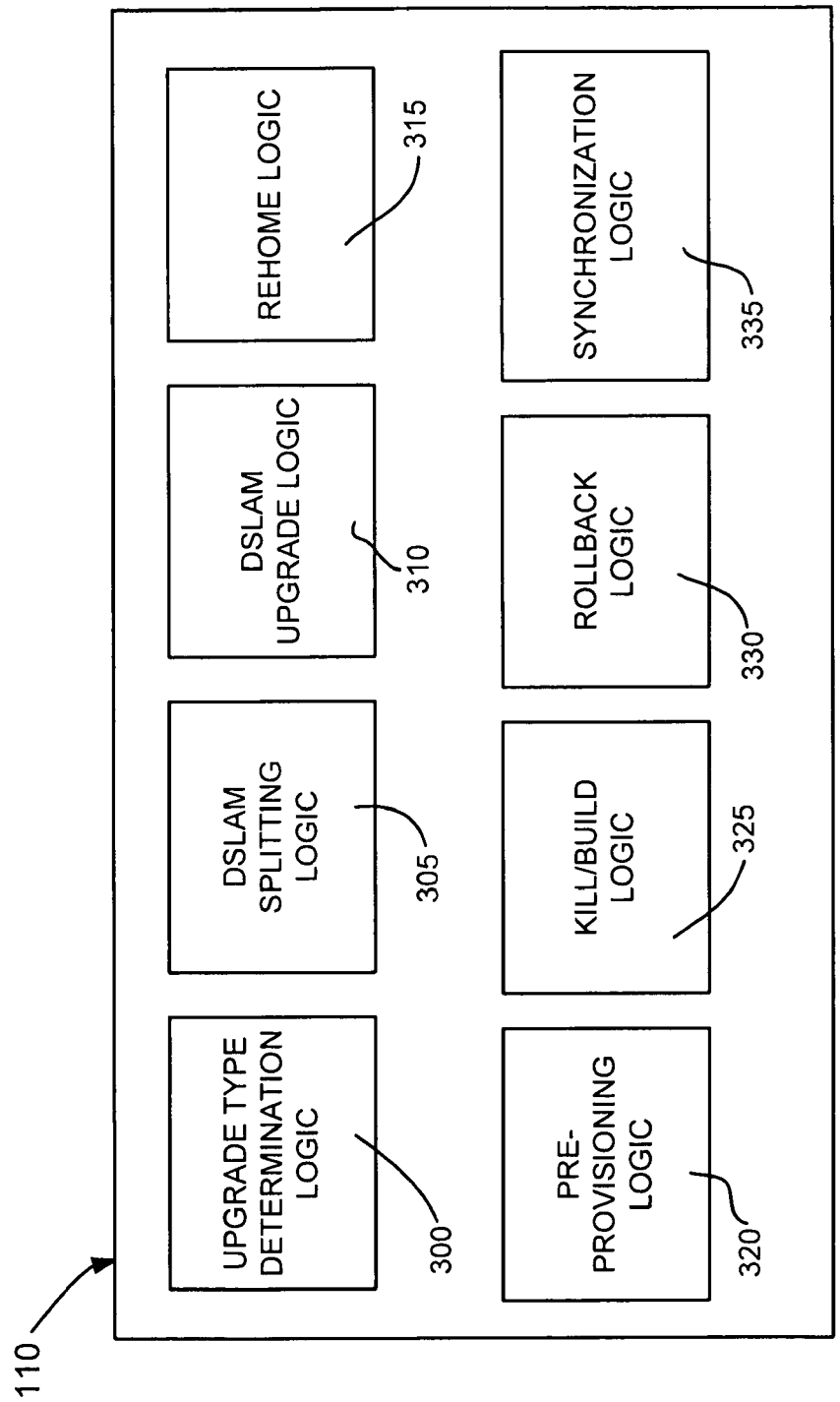
FIG. 3 depicts a diagram of exemplary functional components of a network upgrade tool illustrated in FIG. 1.

FIG. 3 depicts a diagram of exemplary functional components of network upgrade tool 110. As illustrated, network upgrade tool 110 may include upgrade type determination logic 300, DSLAM splitting logic 305, DSLAM upgrade logic 310, rehome logic 325, pre-provisioning logic 320, kill/build logic 325, rollback logic 330, and synchronization logic 335. The functions described in FIG. 3 may be performed by one or more of the exemplary components of device 200 depicted in FIG. 2.

Upgrade type determination logic 300 may include any hardware, software, or combination of hardware and software based logic (e.g., processing unit 220) that enables network upgrade tool 110 to identify a type of upgrade to perform for a particular customer. For example, upgrade type determination logic 300 may receive an upgrade selection from a user of device 130, via interface 135. Alternatively, upgrade type determination logic 300 may receive a selection of a particular DSL customer from a user of device 130, via interface 135. Upgrade type determination logic 300 may retrieve information associated with the particular DSL customers associated with DSLAM 160 (e.g., from provisioning and inventory database 115) and may determine what type of upgrade to perform (if any) based on the retrieved information. For example, the information retrieved from provisioning and inventory database 115 may indicate that the particular DSL customers are currently associated with an over-taxed DSLAM 160. The information retrieved from provisioning and inventory database 115 may further be used to identify available links for connecting a new (or upgraded) DSLAM 160 to DSLAM switch 165 and/or ISP switch 167. If it is determined that an OC3 link is not available, but that additional DS3 links are available, the particular DSL customers may be assigned to a DSLAM splitting path. If it is determined that an OC3 link is available for association with DSLAM 160, the particular DSL customers may be assigned to a DSLAM upgrade path. If it is determined that a remote DSLAM 160 (e.g., a DSLAM subtended from a host DSLAM to extend a range of DSL service provided to customers) is overtaxed, the particular DSLAM customers may be assigned to a DSLAM rehome path.

DSLAM splitting logic 305 may include any hardware, software, or combination of hardware and software based logic (e.g., processing unit 220) that enables network upgrade tool 110 to perform steps necessary to setup, verify, and transition a particular DSL customer from a current DSLAM 160 to a new (or "target") logical DSLAM. As will be described in additional detail below, these steps may include determining whether the particular DSL customer is eligible for pre-provisioning on the target logical DSLAM, determining whether the target DSLAM meets particular eligibility requirements, determining whether information and/or changes need to be made on DSLAM switch 165, ISP switch 167, or gateway router 170 associated with the logical DSLAM, etc.

DSLAM upgrade logic 310 may include any hardware, software, or combination of hardware and software based logic (e.g., processing unit 220) that enables network upgrade tool 110 to perform steps necessary to setup, verify, and transition a particular DSL customer from a current DSLAM 160 to a new (or "target") upgraded DSLAM. As described above, an upgraded DSLAM may include a DSLAM whose switch link has been upgraded from a DS3 link to an OC3 link. As will be described in additional detail below, these steps may include determining whether the particular DSL customer is eligible for pre-provisioning on the upgraded target DSLAM, whether information and/or changes need to be made on DSLAM switch 165. ISP switch 167, or gateway router 170 associated with the upgraded DSLAM, etc.

Rehome logic 315 may include any hardware, software, or combination of hardware and software based logic (e.g., processing unit 220) that that enables network upgrade tool 110 to redesignate a remote DSLAM 360 to either a new host DSLAM, or alternatively, to convert the remote DSLAM 360 to a host DSLAM, thereby increasing available bandwidth. Rehome logic 315 may, similar to DSLAM upgrade logic 310, reuse the current DSLAM in a new path.

Pre-provisioning logic 320 may include any hardware, software, or combination of hardware and software based logic (e.g., processing unit 220) that enables network upgrade tool 110 to pre-provision DSL circuit information for a particular DSL customer prior to activation of the pre-provisioned DSL circuit. For example, pre-provisioning logic 320 may be configured to retrieve information associated with the particular DSL customer (e.g., from provisioning and inventory database 115), and may setup the target virtual or upgrade DSLAM in an identical manner as the current circuit.

In one implementation, the retrieved customer information may include a customer identifier (e.g., their telephone number), a data local exchange carrier (DLEC) circuit identifier, a current DSLAM identifier, a current DSLAM VPI/VCI assignment, a current L2 switch name, customer speed, a current ISP circuit identifier, a current ISP VPI/VCI, a data-link connection identifier (DLCI), or an IP address.

Kill/build logic 325 may include any hardware, software, or combination of hardware and software based logic (e.g., processing unit 220) that enables network upgrade tool 110 to prepare a particular DSL customer for moving to the target DSLAM. Unlike pre-provisionable customers, DSL circuits associated with kill/build customers are unable to be pre-provisioned on a target DSLAM. For example, a customer may be a static IP address customer. Because this customer has a unique IP address, network upgrade logic tool 110 can not pre-provision the router in accordance to associate with the target DSLAM without disrupting service on the current DSLAM. Such customers may be taken down from their current DSLAM and built on the target DSLAM within a predetermined maintenance window.

For example, kill/build logic 325 may retrieve information associated with the particular DSL customer (e.g., from provisioning and inventory database 115), and may setup the target virtual or upgrade DSLAM in an identical manner as the current circuit.

In combination with DSLAM splitting logic 305, DSLAM upgrade logic 310, and rehome logic 315, network upgrade tool 110 may verify the operation of pre-provisioning logic 315 and kill/build logic 325 at various stages throughout the network upgrade process and provide status updates with network upgrade tool 110.

Rollback logic 330 may include any hardware, software, or combination of hardware and software based logic (e.g., processing unit 220) that enables network upgrade tool 110 to step back from any changes implemented by pre-provisioning logic 320, kill/build logic 325, or cutover operations relating to the customer account. In this manner, customers whose accounts are not properly verified prior to cutover or that encounter problems even after cutover, may be reverted to original, non-upgraded status to avoid any unnecessary disruption of service. In one implementation, rollback logic 330 may maintain the ability to roll back an upgrade project after cutover for approximately two days. In this manner, significant problems resulting from the cutover may be reversed to allow for correction.

Synchronization logic 335 may include any hardware, software, or combination of hardware and software based logic (e.g., processing unit 220) that enables network upgrade tool 110 to support changes to customer accounts that may occur between initial upgrade project generation and final completion of the project. For example, regular orders may be initiated by DSL customers who need to change their service, such as modifications to account bandwidth, static IP address request, disconnection of DSL service, etc. These orders may be received and acted upon following upgrade project completion and final implementation of the upgrade. Synchronization logic 335 may facilitate inclusion of such changes into the upgrade project. For example, synchronization logic 335 may monitor inventory and provisioning database 115 for any changes in the system that may affect an upgrade project, and may sync any identified changes with the upgrade project.

Figure 4A:
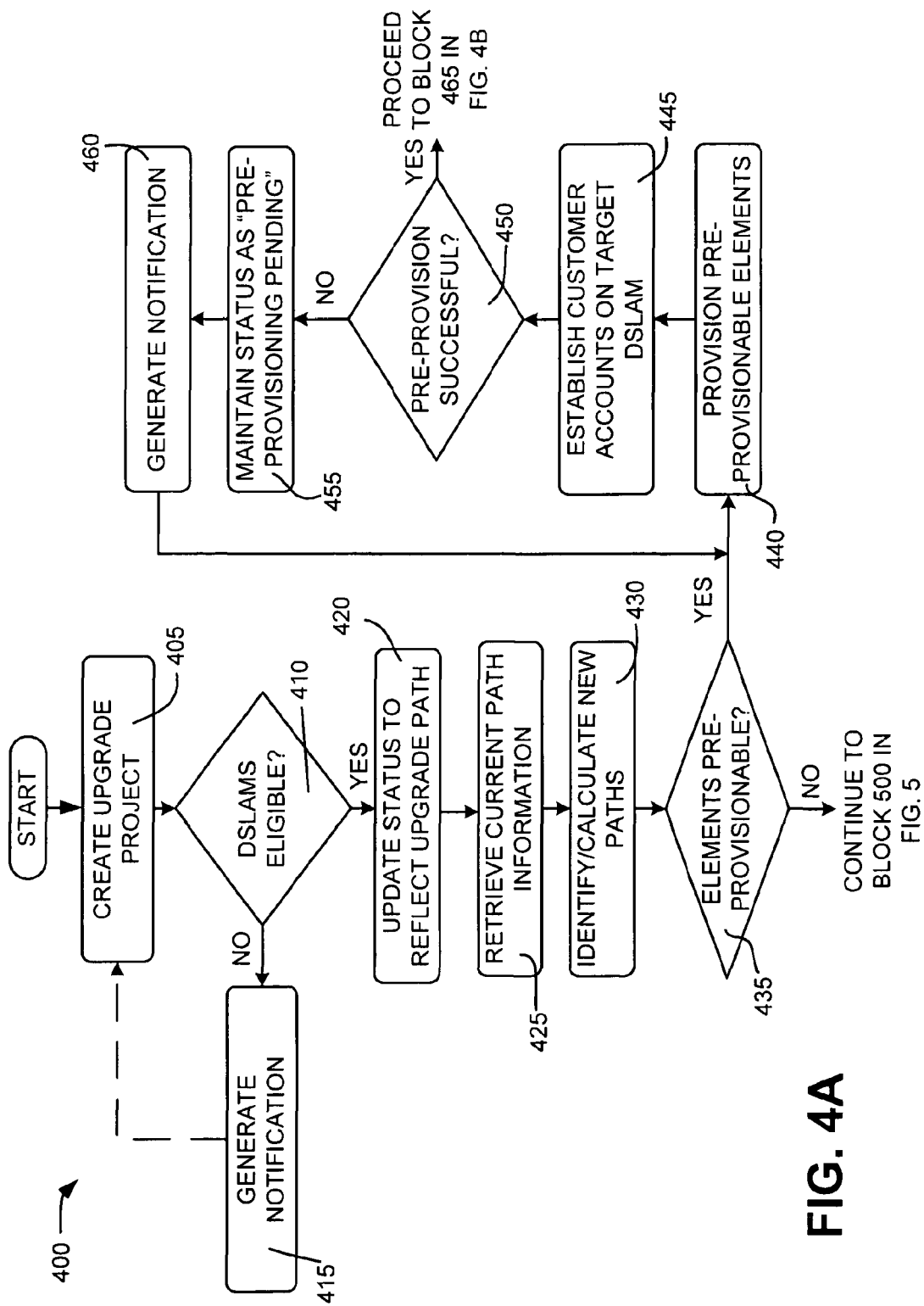
Figure 4B:
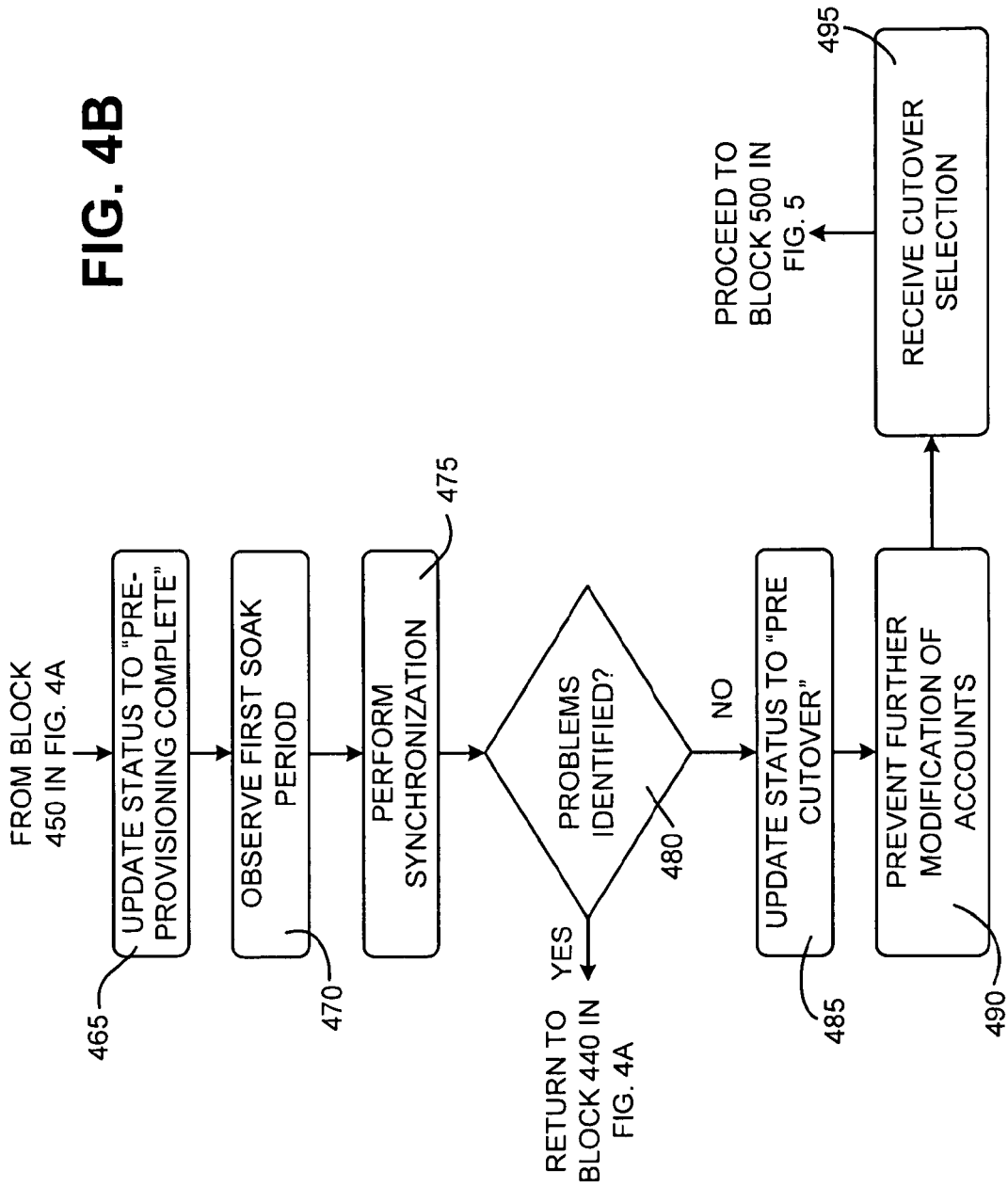

FIGS. 4A, 4B and 5 illustrate flow charts of an exemplary process 400 for upgrading a DSL network according to implementations described herein. In one implementation, process 400 may be performed by network upgrade tool 110. In another implementation, some or all of process 400 may be performed by another device or group of devices, including or excluding network upgrade tool 110.

As illustrated in FIG. 4A, process 400 may begin with creation of an upgrade project (block 405). For example, network upgrade tool 110, via user interface device 135, may receive a selection of a source DSLAM associated with one or more customer accounts for inclusion in an upgrade project. In one implementation, various information may be necessary to create an upgrade project, including a project name, a source DSLAM identification, a target DSLAM identification, and/or a project type (e.g., a DSLAM splitting type or a DSLAM upgrade type).

Once project information has been received by upgrade type determination logic 300, it may be determined (e.g., by one of DSLAM splitting logic 305 or DSLAM upgrade logic 310) whether the source and target DSLAMS are eligible for upgrade processing (block 410). For example, network upgrade tool 110 may determine whether the identified source DSLAM, target DSLAM, L2 switch, and gateway router are sufficiently connected to and interoperable with network upgrade tool 110. Further, network upgrade tool 110 may determine whether information regarding DSL customers connected to the source DSLAM is available in provisioning and inventory database 115. Additionally, it may be verified that the target DSLAM does not include existing customers that may conflict with customers transferred from the source DSLAM and that the target DSLAM is "unavailable" to receiving new customers throughout the duration of the upgrade process. This may ensure that conflicts do not arise between multiple customer accounts during the upgrade process.

If it is determined that the upgrade project may not proceed, that is, that the network equipment has either not been validated or verified (block 410-NO), a notification may be generated (block 415) and the process may either end or return to block 400 for creation of a new project. However, if it is determined that the upgrade project may proceed (i.e., that the information and network equipment designated have been verified) (block 410-YES), a status of both the source DSLAM and the target DSLAM may be updated to indicate the selected upgrade path (e.g., split, upgrade, or rehome) (block 420). In one implementation, the notifications and status updates may be stored in, for example, status/verification database 130 for access by network upgrade tool 110 as well as additional network elements via network 145. In this manner, subsequent inquiries relating to either the source DSLAM or the target DSLAM may identify the DSLAMS as part of the upgrade process.

Information regarding the current DSL paths associated with the source DSLAM may be retrieved, for example, from provisioning and inventory database 115 (block 425). For example, customer identifiers associated with the source DSLAM may be retrieved. Additionally, port information, PVC identification information, DLEC circuit identification information, DSLAM VPI/VCI assignment, current L2 switch name, customer speed, current ISP circuit identifier, current ISP VPI/VCI, IP address, static/dynamic designation information, and DLCI information may be retrieved for each customer identifier. In one implementation, the retrieved information may be copied to replication database 125 for use throughout upgrade process 400.

Next, new paths or packages of customer-specific DSL circuit information may be created in network upgrade tool 110 based on the retrieved information and the new path information associated with the upgraded DSLAM (block 430). In one implementation, the new path may include the ISP circuit identifier, the VPI/VCI, the IP address, etc. Although not associated with the target DSLAM, the generated packages of customer-specific DSL circuit information may be formed for rapid deployment to associated network equipment during either pre-provisioning or kill/build cutover operations.

Once the new paths have been identified, it may be determined, for each customer, whether all or part of the upgrade may be pre-provisioned or whether portions of the upgrade should be performed as kill/build processing on the night of the transition (block 435). In one implementation, a status of each network element associated with each path may be indicated as being subject to kill/build or as being pre-provisionable. In some implementations, new equipment in a path (e.g., DSLAMS, routers, and switches) may be pre-provisioned, since paths involving old equipment may need to be removed from the old service prior to becoming provisioned for the new service. For example, affiliated customers having dynamic IP addresses may be fully pre-provisionable on the target DSLAM, the L2 switch, and the gateway router. Customers having static IP addresses, on the other hand, may not be pre-provisionable on the L2 switch, since both the old and new path may be assigned to the same IP address (on the gateway router). However, in this scenario, the target DSLAM may remain fully pre-provisionable.

For customer accounts that include non-pre-provisionable elements, these accounts may be subjected to kill/build processing. For these elements, processing may proceed to block 500 described below. However, for customer upgrades having one or more pieces of equipment that are eligible for pre-provisioning, the identified pre-provisionable equipment may be provisioned (block 440). In one implementation, the DSLAM, L2 switch, or gateway router, may be provisioned by blocking out the identified path elements and assigning them to the customer in advance of the upgrade. For example, for a pre-provisionable DSLAM, the VPI and VCI identified in the new path may be blocked out in advance of the upgrade. In other words, the VPI and VCI that will be associated with a particular customer on the target DSLAM may be identified based on the information retrieved for the source DSLAM. This identified VPI and VCI (on the target DSLAM) may be marked as assigned, thereby preventing another customer from being assigned to the VPI/VCI.

Customer accounts corresponding to the pre-provisionable customers on the source DSLAM may be established on the target DSLAM, L2 switch, and gateway router (block 445). In one implementation, the customer accounts may be established using the information retrieved in block 425 and using the new path identified in block 430. Further in one implementation, pre-provisioning may occur in a predetermined order, with the target DSLAM being pre-provisioned first, followed by the L2 switch and gateway router being pre-provisioned in parallel. However, it should be understood that, if one or more of these elements is not-pre-provisionable, this order may change.

It may be determined whether any customer accounts identified in block 435 are unable to be successfully pre-provisioned, or if the L2 switch or gateway router are unable to be pre-provisioned (block 450). If not (block 450-NO), a status of the upgrade project may be maintained as "pre-provisioning pending" (block 455). The customer account or accounts that have not been successfully pre-provisioned may be updated to include an appropriate notification that may include a reason corresponding to the failure (block 460). Processing may return to block 440 for handling of the unsuccessful customer accounts or other issues. In one implementation, a notification may be generated to a user of network upgrade tool 110 indicating the status of the pre-provisioning operation.

If it is determined that all pre-provisionable equipment identified in block 435 has been successfully pre-provisioned (block 450-YES), the status of the upgrade project may be set to "pre-provisioning complete" (block 465-FIG. 4B). Following pre-provisioning, a predetermined calm or "soak" period may be observed prior to performing pre-cutover processing (block 470). This soak period may enable network upgrade tool 110 to experience or determine any problems with the pre-provisioned equipment. In one exemplary implementation, the soak period may be approximately two nights.

Following expiration of the soak period, any intervening changes to customer accounts may be synchronized with the new customer accounts on the target DSLAM (block 475). For example, if, following creation of the upgrade project and retrieval of customer account information associated with the source DSLAM, a customer modified their account to increase their bandwidth, this modification may be incorporated into the customer account created in block 435. In another exemplary implementation, a customer may modify an account to include a static IP address. Consistent with implementations described herein, synchronization logic 135 may retrieve the changes to the customer accounts, and may update the status of any affected upgrade project accordingly. For example, modifications to a user account may cause a formerly pre-provisionable switch to become a kill/build item.

Network upgrade tool 110 may determine whether any problems have arisen which may cause the status of the project to return to "pre-provisioning pending" (block 480). If so (block 480-YES), the process may return to block 440 for handling of the unsuccessful customer accounts or other issues. However, if the status of the project remains as "pre-provisioning complete" (e.g., if no problems are identified) (block 480-NO), the project status may be updated to "pre-cutover" (block 485). At this point, additional internal orders, modifications, or changes to the customer accounts or network equipment may be prevented (block 490). In this manner, there may be no possibility of additional, unsynchronized changes being made prior to transition from the source DSLAM to the target DSLAM.

At this point in process 400, all pre-provisionable elements may have been successfully provisioned, and all other kill/build elements may have been accurately identified (e.g., in block 435). However, customers may continue to operate using the source DSLAM and its associated network paths. Once it has been determined that the upgrade project is ready for cutover, network upgrade tool 110 may receive a cutover selection from a user (block 495). In one implementation, the cutover selection may be made following a predetermined period of time after the pre-cutover status change (e.g., in block 485) (e.g., the following night's maintenance window). In addition, the cutover selection may be made following physical modification of the DSL circuit elements (e.g., the DSLAM, the L2 switch, and the gateway router). For example, changing network cards, adding circuits to the target DSLAM, upgrading links, performing logical splitting of the target DSLAM, etc.

Upon receipt of the cutover selection, network upgrade tool 110 may provision any un-provisioned network elements beginning with the kill/build elements identified in block 435 (block 500 of FIG. 5). For pre-provisioned elements, post-cutover actions may include the "kill" portion of the kill/build, where the existing network path corresponding to the pre-provisioned element is taken down or removed, thereby leaving the pre-provisioned element in its place. Network upgrade tool 110 may block the elements associated with the DSL circuit using the source DSLAM (block 505). In this way, changes to the source DSLAM that may affect the ability to rollback to the previous configuration may be eliminated. Upon completion of the provisioning in block 500, network upgrade tool 110 may generate a report that includes information regarding the newly provisioned DSL circuits (block 510). The generated report may be transmitted to a network upgrade tool for testing of the provisioned circuits (block 515). Test results may be received from network upgrade tool 110 (block 520) and it may be determined whether the newly provisioned DSL circuits have been successfully created (block 525).

If it is determined that the newly provisioned DSL circuits have not been successfully created (e.g., that one or more DSL circuits has not passed the testing by the network upgrade tool) (block 525-NO), the physical changes may be reversed and rollback logic 325 may revert the project to the pre-cutover stage (block 490) for identification and correction of the problem (block 530). However, if it is determined that the newly provisioned DSL circuits have been successfully created (block 525-YES), a second calming or soaking period may be initiated (block 535). In one exemplary implementation, the second soaking period may be approximately two days and may allow time for the identification of post-cutover problems, particularly, as reported by affected DSL customers.

It may be determined whether a predetermined number or percentage of problems have been identified during the second soak period (block 540). If it is determined that the predetermined number or percentage of problems have been identified during the second soak period (block 540-YES), the physical changes may be reversed and rollback logic 325 may revert the project to the pre-cutover stage (block 490) for identification and correction of the problems (block 545). However, if it is determined that the predetermined number or percentage of problems have not been identified during the second soak period (block 540-NO), the upgrade project may move into a complete stage (block 550).

In the complete stage, the DSL path information in provisioning and inventory database 115 may be updated to reflect the newly provisioned DSL circuits (block 555). Additionally, the blocks relating to the source DSLAM and related network elements may be removed (block 560), thereby enabling subsequent use of the network elements.

Systems and/or methods described herein may receive network information from a network (e.g., a DSL network) and may create an upgrade project that includes a source DSLAM and a target DSLAM. The systems and/or methods may determine an upgrade path associated with the network information (e.g., splitting a DSLAM, upgrading a DSLAM, or rehoming a DSLAM). The systems and/or methods may determine a new path based on the determined upgrade path, and may identify customers within the upgrade project that are pre-provisionable. The systems and/or methods may perform pre-provisioning of the pre-provisionable elements, and may verify that any pre-provisioning was performed successfully. The systems and/or methods may synchronize the pre-provisioned elements based on intervening changes or modifications to the associated customer accounts. Upon synchronization and re-verification, the systems and/or methods may initiate cutover, and may determine, following a predetermined soak period, whether the new DSL circuits resulting from the cutover are operating properly. If not, the systems and/or methods may enable rollback of the upgrade project to the old DSL paths. However, if the new DSL circuits resulting from the cutover are operating properly, the systems and/or methods may and may release the old network elements for reallocation or modification.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with regard to FIGS. 4A-5, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    identifying at least one new digital subscriber line (DSL) path associated with a target DSL access multiplexer (DSLAM);
    identifying pre-provisionable elements associated with the at least one new DSL path;
    provisioning the identified pre-provisionable elements prior to transition from at least one existing DSL path to the at least one new DSL path;
    receiving a notification that physical network changes associated with the target DSLAM have been made; and
    provisioning non-pre-provisioned elements following receipt of the notification.

2. The computing device-implemented method of claim 1, wherein the target DSLAM comprises one of an upgraded DSLAM or a split DSLAM.

3. The computing device-implemented method of claim 1, further comprising:
    determining whether a source DSLAM and the target DSLAM are eligible for upgrade; and
    identifying the at least one new digital subscriber line (DSL) path when the source DSLAM and the target DSLAM are eligible for upgrade.

4. The computing device-implemented method of claim 1, wherein determining whether the source DSLAM and the target DSLAM are eligible for upgrade further comprises:
    determining that the target DSLAM does not include existing customers that conflict with customers transferred from the source DSLAM; and
    determining that the target DSLAM is available to receive new customers throughout a duration of an upgrade process.

5. The computing device-implemented method of claim 1, wherein identifying the at least one new DSL path associated with the target DSLAM further comprises:
    retrieving information regarding the at least one existing DSL path; and
    identifying the at least one new DSL path based on the retrieved existing DSL path information.

6. The computing device-implemented method of claim 5, further comprising:
    establishing customer accounts on the target DSLAM based on the retrieved information and the at least one new DSL path.

7. The computing device-implemented method of claim 1, wherein identifying pre-provisionable elements associated with the at least one new DSL path further comprises:
    determining whether elements in the at least one new DSL path are new network elements;
    determining a customer type associated with the at least new DSL path; and
    identifying the pre-provisionable elements associated with the at least one new DSL path based on the determination of whether the elements in the at least one new DSL path are new network elements and based on the customer type.

8. The computing device-implemented method of claim 1, further comprising:
    determining whether the identified pre-provisionable elements have been successfully provisioned; and
    updating a project status to pre-provisioning complete when the identified pre-provisionable elements have been successfully provisioned.

9. The computing device-implemented method of claim 8, further comprising:
    maintaining the project status at pre-provisioning pending when the identified pre-provisionable elements have not been successfully provisioned; and
    generating a notification in the upgrade project indicating that the identified pre-provisionable elements have not been successfully provisioned.

10. The computing device-implemented method of claim 1, further comprising:
    waiting a first soak period following provisioning the identified pre-provisionable elements.

11. The computing device-implemented method of claim 1, further comprising:
    receiving modifications to at least one customer account associated with the source DSLAM following provisioning of the identified pre-provisionable elements;
    synchronizing information associated with the at least one new DSL path based on the received modifications; and
    repeating the provisioning of affected elements.

12. The computing device-implemented method of claim 1, further comprising:
    provisioning the non-pre-provisioned elements following a physical upgrade of the at least one new DSL path;
    blocking access to network elements associated with the existing DSL path; and
    determining whether the at least one new DSL path tests successfully.

13. The computing device-implemented method of claim 12, further comprising:
    rolling back to the source DSLAM and an existing DSL path when it is determined that the at least one new DSL path does not test successfully.

14. The computing device-implemented method of claim 12, further comprising:
    observing a second soak period prior to updating a status of the upgrade project to complete.

15. A device, comprising:
    a memory to store one or more instructions; and
    a processor to execute the one or more instructions to:
        identify a new network configuration;
        determine whether elements in the new network configuration are new network elements;
        determine a customer type associated with the new network configuration;
        identify pre-provisionable elements associated with the new network configuration based on whether the elements in the new network configuration are new network elements and based on the customer type;
        provision the identified pre-provisionable elements prior to transition from an existing network configuration to the new network configuration;

receive a notification that physical network changes associated with the new network configuration have been made; and provision non-pre-provisioned elements following receipt of the notification.

16. The device of claim 15, wherein the new network configuration comprises at least one new digital subscriber line (DSL) path associated with a target DSL access multiplexer (DSLAM), and wherein the existing network configuration comprises at least one existing DSL path associated with a source DSLAM.

17. The device of claim 15, where the processor is further configured to:

receive modifications to at least one customer account associated with the new network configuration following provisioning of the identified pre-provisionable elements;

synchronize the information associated with the new network configuration based on the received modifications; and repeat the provisioning of affected network elements following synchronization of the modified information.

18. A system, comprising:

a source digital subscriber line access multiplexer (DSLAM);

a target DSLAM;

a switch operatively connected to at least one of the source DSLAM and the target DSLAM;

a router operatively coupled to the switch; and a network upgrade tool operatively coupled to the source DSLAM, the target DSLAM, the switch, and the router, wherein the network upgrade tool is configured to:

identify at least one new digital subscriber line (DSL) path associated with the target DSLAM;

identify pre-provisionable elements associated with the at least one new DSL path;

provision the identified pre-provisionable elements prior to transition from at least one existing DSL path associated with the source DSLAM to the at least one new DSL path;

receive a notification that physical network changes associated with the target DSLAM have been made; and provision non-pre-provisioned elements following receipt of the notification.

19. The system of claim 18, wherein the network upgrade tool is further configured to:

receive modifications to at least one customer account associated with the new network configuration following provisioning of the identified pre-provisionable elements;

synchronize the information associated with the new network configuration based on the received modifications; and repeat the provisioning of affected network elements following synchronization of the modified information.

* * * * *